US012421376B2

(12) United States Patent
Cabioch et al.

(10) Patent No.: US 12,421,376 B2
(45) Date of Patent: Sep. 23, 2025

(54) RUBBER COMPOSITION FOR A LARGE-SIZED TIRE

(71) Applicant: COMPAGNIE GENERALE DES ETABLISSEMENTS MICHELIN, Clermont-Ferrand (FR)

(72) Inventors: Jean-Luc Cabioch, Clermont-Ferrand (FR); Anthony Monod, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 746 days.

(21) Appl. No.: 17/765,085

(22) PCT Filed: Sep. 29, 2020

(86) PCT No.: PCT/FR2020/051699
§ 371 (c)(1),
(2) Date: Mar. 30, 2022

(87) PCT Pub. No.: WO2021/064317
PCT Pub. Date: Apr. 8, 2021

(65) Prior Publication Data
US 2022/0403144 A1      Dec. 22, 2022

(30) Foreign Application Priority Data

Sep. 30, 2019 (FR) ..................... 1910790

(51) Int. Cl.
*C08L 9/06* (2006.01)
(52) U.S. Cl.
CPC ........... *C08L 9/06* (2013.01); *C08L 2205/025* (2013.01); *C08L 2205/035* (2013.01)
(58) Field of Classification Search
CPC . C08L 2205/025; C08L 2205/035; C08L 9/06
USPC ........................................................ 524/89
See application file for complete search history.

(56) References Cited

U.S. PATENT DOCUMENTS

| | | |
|---|---|---|
| 3,603,370 A | 9/1971 | Hylbert et al. |
| 4,383,567 A | 5/1983 | Crum et al. |
| 4,446,902 A | 5/1984 | Madec et al. |
| 5,227,425 A | 7/1993 | Rauline |
| 5,852,099 A | 12/1998 | Vanel |
| 5,900,449 A | 5/1999 | Custodero et al. |
| 6,166,108 A | 12/2000 | Materne et al. |
| 6,420,488 B1 | 7/2002 | Penot |
| 6,536,492 B2 | 3/2003 | Vasseur |
| 7,199,175 B2 | 4/2007 | Vasseur |
| 7,250,463 B2 | 7/2007 | Durel et al. |
| 7,900,667 B2 | 3/2011 | Vasseur |
| 10,689,507 B2 | 6/2020 | Abad |
| 11,241,370 B2 | 2/2022 | Valero et al. |
| 2001/0034389 A1 | 10/2001 | Vasseur |
| 2002/0179214 A1* | 12/2002 | Majumdar ......... B29D 30/0005 156/123 |
| 2003/0212185 A1 | 11/2003 | Vasseur |
| 2005/0004297 A1 | 1/2005 | Durel et al. |
| 2005/0032965 A1 | 2/2005 | Valero |
| 2007/0112120 A1 | 5/2007 | Vasseur |
| 2010/0221541 A1 | 9/2010 | Valero et al. |
| 2011/0263784 A1 | 10/2011 | Valero et al. |
| 2013/0048169 A1* | 2/2013 | Erceg ............... B60C 11/0066 152/209.1 |
| 2015/0165842 A1* | 6/2015 | Welter ..................... C08K 5/39 152/523 |
| 2018/0186978 A1 | 7/2018 | Abad |

FOREIGN PATENT DOCUMENTS

| | | | |
|---|---|---|---|
| AU | 2017371532 B2 * | 11/2023 | .............. B60C 1/00 |
| EP | 0501227 A1 | 9/1992 | |
| EP | 0735088 A1 | 10/1996 | |
| EP | 0795427 A1 | 9/1997 | |
| EP | 0810258 A1 | 12/1997 | |
| EP | 0903249 A1 | 3/1999 | |
| EP | 0994150 A1 | 4/2000 | |
| EP | 1000960 A1 | 5/2000 | |
| EP | 1831034 B1 | 5/2008 | |
| WO | 97/36724 A2 | 10/1997 | |
| WO | 99/16600 A1 | 4/1999 | |
| WO | 00/5300 A1 | 2/2000 | |
| WO | 00/5301 A1 | 2/2000 | |
| WO | 02/10269 A2 | 2/2002 | |
| WO | 03/016215 A1 | 2/2003 | |
| WO | 03/016387 A1 | 2/2003 | |
| WO | 2013/155038 A1 | 10/2013 | |
| WO | 2016/202968 A1 | 12/2016 | |
| WO | 2018/104671 A1 | 6/2018 | |

OTHER PUBLICATIONS

International Search Report dated Nov. 17, 2020, in corresponding PCT/FR2020/051699 (4 pages).
S. Brunauer, et al. "Adsorption of Gases in Multimolecular Layers", J. Am. Chem. Soc., vol. 60, pp. 309-319 (1938).

* cited by examiner

*Primary Examiner* — Kelechi C Egwim
(74) *Attorney, Agent, or Firm* — Venable LLP

(57) ABSTRACT

Large tires, the tread of which has a mean volumetric void ratio over the entire tread of greater than 10%, comprise a composition based on at least one diene elastomer, on a vulcanization system and from 0.10 to 1 phr of at least one organic polysulfide.

20 Claims, No Drawings

RUBBER COMPOSITION FOR A LARGE-SIZED TIRE

BACKGROUND

The present invention relates to large tyres, in particular tyres for a construction plant vehicle or for an agricultural vehicle.

A pneumatic tyre is obtained by stacking different rubber-based plies and different components on a rotary drum, followed by a shaping of the assembly into a toroidal shape. The plies successively applied to the drum in order to obtain a pneumatic tyre are generally: a butyl rubber ply which forms the inner liner airtight to the inflation gas, a carcass ply based on reinforcing threads embedded in the rubber, which ensures the mechanical strength of the tyre, followed by the arranging of the bead wires, optionally of the bead wire filler profiled elements, then of the sidewalls, of the reinforcing belt and of the tread. Once shaped into the form of a torus, the green tyre (i.e. non-crosslinked tyre) is placed inside a curing mould, the internal cavity of which has the shape and the dimensions of the finished tyre. Once in the mould, the external walls of the tyre are flattened against the internal metal walls of the curing mould by means of a curing bladder which is itself expandable under the effect of a pressurized heat-transfer fluid. The tread design on the mould inserts and that on the shells is then imprinted onto the green tyre, which is subsequently crosslinked with the aid of heat. This step makes it possible in particular to set the tread pattern.

The "pattern" of a tread is a more or less complex system of raised elements, separated from one another by cut-outs. The raised elements of a tread pattern may be either ribs or tread blocks.

A "rib" is a raised element formed on a tread and extending essentially along the circumferential direction, this element being delimited either by two cut-outs or by a cut-out and an edge of the tread. A rib comprises two lateral walls and a contact face, the latter being intended to come into contact with the road surface during running. This element extends in the circumferential direction and runs all around the tyre.

A "tread block" is a raised element formed on a tread, this element being delimited by one or more rectilinear, curved or circular cut-outs, and optionally by an edge of the tread. A tread block also comprises a contact face, the latter being intended to come into contact with the road surface during running.

The cut-outs may either be grooves or sipes, depending on their width, that is to say the distance between the walls of material delimiting them, and their function during running. The width of a groove is typically at least equal to 2 mm, whereas the width of a sipe is typically at most equal to 2 mm. When the tyre is running, the walls of material of a groove do not come into contact with one another, whereas the walls of material of a sipe at least partially come into contact with one another.

During the building of the tyre in a curing mould (when the curing bladder flattens the external walls of the tyre against the internal walls of the mould), the mould inserts are recessed into the tread, involving a displacement of the composition which forms it. This displacement of material may affect the overall architecture of the tyre. This is particularly true for large tyres, the tread of which has relatively deep grooves, much deeper than those present on smaller tyres such as the tyres of passenger vehicles, two-wheel vehicles, lorries, etc.

Specifically, large tyres have a mean tread block height of greater than 20 mm, generally between 65 and 120 mm, and/or have a mean volumetric void ratio over the entire tread of greater than 10%, generally between 10% and 50% for tyres for construction plant vehicles, and between 50% and 78% for tyres for agricultural vehicles.

Furthermore, it may be noted that in the case of large tyres, for construction plant vehicles in particular, the cut-outs denote grooves, the width of which is greater than 10 mm, or even greater than 20, 30, 40 or 50 mm, generally between 10 and 60 mm.

Tyre treads for an agricultural vehicle generally themselves comprise a plurality of lugs, and generally do not comprise ribs. The lugs are elements that are raised with respect to a bottom surface which is a surface of revolution about the axis of rotation of the tyre. A lug generally has an elongate parallelepipedal overall shape made up of at least one rectilinear or curvilinear portion, and is separated from the adjacent lugs by large voids. A lug may be made up of a succession of rectilinear portions, as described in the documents U.S. Pat. Nos. 3,603,370, 4,383,567, EP795427 or may have a curvilinear shape, as set out in the documents U.S. Pat. No. 4,446,902, EP903249, EP1831034. The distance between two consecutive lugs is often much greater than the distance between two tread blocks for a construction plant vehicle. It can be greater than 10 cm, sometimes around 25 cm.

Due to the morphology of their tread, large tyres, whether they are intended to be fitted to construction plant vehicles, agricultural vehicles or other vehicles, are particularly affected by the movements of material of the various plies that form the tyre during of the building thereof in the curing mould. In these cases, the architecture of the tyre before and after curing may change.

To obtain a given architecture in a cured tyre (after crosslinking), tyre designers anticipate the movements of material linked to the building of the tyre in the curing mould, and adjust the architecture of the green tyre accordingly. In the case of large tyres, this anticipation work is more complicated in so far as more material is displaced.

It would therefore be useful for tyre designers to have means for better controlling the displacement of material during tyre building in the curing mould. Advantageously, these means should not have an impact on the properties of the material before and after curing. To the applicant's knowledge, no solution has been proposed to solve this problem.

Continuing its research, the applicant has discovered that the use of organic polysulfide in a composition for a large tyre makes it possible to limit the displacement of the compositions of the various plies which make up the tyre and therefore to reduce the impact of the building of the tyre on its final architecture after curing.

The applicant has observed that this solution does not adversely affect the viscosity of the composition before curing and does not therefore have a negative impact on the processability. The applicant has additionally observed that this solution does not negatively affect the cured properties of the tyre obtained after curing, in particular the stiffness and the hysteresis.

SUMMARY

Thus, one subject of the invention is a tyre provided with a tread, of which the mean volumetric void ratio over the entire tread is greater than 10%, said tyre comprising a composition based on at least one diene elastomer, on a vulcanization system and from 0.1 to 1 phr of at least one organic polysulfide.

I-DEFINITIONS

In the present text, the circumferential, axial and radial directions denote respectively a direction tangential to the tread surface of the tyre and oriented in the direction of rotation of the tyre, a direction parallel to the axis of rotation of the tyre, and a direction perpendicular to the axis of rotation of the tyre. "Radially inner and radially outer, respectively" is understood to mean "closer to and further away from the axis of rotation of the tyre, respectively". "Axially inner and axially outer, respectively" is understood to mean "closer to and further away from the equatorial plane of the tyre, respectively", the equatorial plane of the tyre being the plane which passes through the middle of the tread surface of the tyre and is perpendicular to the axis of rotation of the tyre.

The expression "composition based on" should be understood to mean a composition comprising the mixture and/or the product of the in situ reaction of the various constituents used, some of these constituents being able to react and/or being intended to react with one another, at least partially, during the various phases of manufacture of the composition; it thus being possible for the composition to be in the completely or partially crosslinked state or in the non-crosslinked state.

The expression "phr" should be understood as meaning, within the meaning of the present invention, the part by weight per hundred parts by weight of elastomer.

In the present text, unless expressly indicated otherwise, all the percentages (%) indicated are weight percentages (%).

Moreover, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b). In the present document, when an interval of values is denoted by the expression "from a to b", the interval represented by the expression "between a and b" is also and preferentially denoted.

When reference is made to a "predominant" compound, this is understood to mean, within the meaning of the present invention, that this compound is predominant among the compounds of the same type in the composition, that is to say that it is the one which represents the greatest amount by weight among the compounds of the same type. Thus, for example, a predominant elastomer is the elastomer representing the greatest weight relative to the total weight of the elastomers in the composition. In the same way, a "predominant" filler is that representing the greatest weight among the fillers of the composition. By way of example, in a system comprising just one elastomer, the latter is predominant for the purposes of the present invention and, in a system comprising two elastomers, the predominant elastomer represents more than half of the weight of the elastomers. On the contrary, a "minor" compound is a compound which does not represent the greatest fraction by weight among the compounds of the same type. Preferably, the term "predominant" is understood to mean present at more than 50%, preferably more than 60%, 70%, 80%, 90%, and more preferentially the "predominant" compound represents 100%. The carbon-comprising compounds mentioned in the description can be of fossil or biobased origin. In the latter case, they may be partially or completely derived from biomass or be obtained from renewable starting materials derived from biomass. They are in particular polymers, plasticizers, fillers, etc.

All the values for glass transition temperature "Tg" described in the present document are measured in a known manner by DSC (Differential Scanning Calorimetry) according to standard ASTM D3418 (1999).

II-DESCRIPTION OF THE INVENTION

II-1 Elastomeric Matrix

The composition of the tyre according to the invention can contain just one diene elastomer or a mixture of several diene elastomers.

The term "diene" elastomer (or, without distinction, rubber), whether natural or synthetic, should be understood, in a known way, as meaning an elastomer composed, at least in part (i.e., a homopolymer or a copolymer), of diene monomer units (monomers bearing two conjugated or non-conjugated carbon-carbon double bonds).

These diene elastomers can be classified into two categories: "essentially unsaturated" or "essentially saturated". The term "essentially unsaturated" is understood to mean generally a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content, always less than 15%, of units of diene origin). Advantageously, the diene elastomer is an essentially unsaturated diene elastomer.

Diene elastomer capable of being used in the context of the present invention is understood in particular to mean:
a) any homopolymer of a conjugated or non-conjugated diene monomer containing from 4 to 18 carbon atoms;
b) any copolymer of a conjugated or non-conjugated diene containing from 4 to 18 carbon atoms and of at least one other monomer.

The other monomer can be ethylene, an olefin or a conjugated or non-conjugated diene. Conjugated dienes that are suitable include conjugated dienes containing from 4 to 12 carbon atoms, in particular 1,3-dienes, notably such as 1,3-butadiene and isoprene. Olefins that are suitable include vinylaromatic compounds containing from 8 to 20 carbon atoms and aliphatic α-monoolefins containing from 3 to 12 carbon atoms.

Vinylaromatic compounds that are suitable include, for example, styrene, ortho-, meta- or para-methylstyrene, the "vinyltoluene" commercial mixture or para-(tert-butyl)styrene. Aliphatic α-monoolefins that are suitable notably include acyclic aliphatic α-monoolefins containing from 3 to 18 carbon atoms.

Preferably, the diene elastomer is selected from the group consisting of polybutadienes (BRs), synthetic polyisoprenes (IRs), natural rubber (NR), butadiene copolymers, isoprene copolymers and mixtures thereof.

The butadiene copolymers are preferentially selected from the group consisting of butadiene/styrene copolymers (SBRs). It should be noted that the SBR can be prepared in emulsion (ESBR) or in solution (SSBR). Whether it is ESBR or SSBR. Mention may in particular be made, among copolymers based on styrene and on butadiene, in particular SBR, of those having a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%. Advantageously, the butadiene/styrene copolymer is an SBR prepared in solution and has a styrene content of between 5% and 60%, preferably from 6% to 30%, by weight, relative to the total weight of the copolymer, and a content (mol %) of 1,2-bonds of the butadiene part of between 4% and 75%, preferably between 15% and 30%.

Preferentially, the diene elastomer is selected from the group consisting of polybutadienes, synthetic polyisoprenes, natural rubber, butadiene/styrene copolymers, and mixtures thereof. Preferably, the diene elastomer is selected from the group consisting of synthetic polyisoprenes, natural rubber and mixtures thereof. Alternatively, just as preferentially, the diene elastomer is selected from the group consisting of butadiene/styrene copolymers and mixtures thereof.

II-2 Organic Polysulfide

The essential feature of the composition of the tyre according to the invention is that it comprises between 0.1 and 1 phr of at least one organic polysulfide.

The presence of organic polysulfide allows partial vulcanization of the rubber composition at low temperature, for example prior to the building of the tyre in a curing mould. Thus, this organic polysulfide makes it possible to set the mixture more quickly and therefore to limit the movements of rubber during the moulding. Thus, during the building of the tyre, this makes it possible to reduce the modifications of the architecture of the tyre between the green state and the cured state.

An "organic polysulfide" is understood to mean an organic compound comprising at least the —$S_n$— linkage with n≥2. Organic is understood to mean that the compound comprises at least one C, H, O or N atom.

The family of organic polysulfides includes non-polymeric organic polysulfides of formula $R_1$—$S_n$—$R_2$ in which n≥2 is the number of sulfur atoms and $R_1$ and $R_2$ represent, independently of one another, an optionally substituted alkyl, aryl, arylalkyl, alkylaryl or cycloalkyl group and preferably an optionally substituted aryl group. Preferably, $R_1$ and $R_2$ are identical.

The family of organic polysulfides also includes polymeric organic polysulfides of formula —[R—$S_n$]$_m$— in which n≥2 is the number of sulfur atoms per unit, m>0 is the number of repeating units and R represents an optionally substituted alkyl, aryl, arylalkyl, alkylaryl or cycloalkyl group and preferably an optionally substituted aryl group.

Preferably, the organic polysulfide is not silicon-containing, that is to say that it does not contain any silicon atoms.

Advantageously, the organic polysulfide is an aromatic polysulfide corresponding to the following general formula (I):

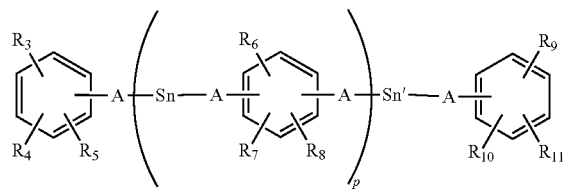

in which:
$R_3$ to $R_{11}$, which may be identical or different, represent a hydrogen atom, an —OH or —O$^-$M$^+$ radical, or a saturated or unsaturated carbon-based chain containing from 1 to 20 carbon atoms, or a group —OR$_{12}$, with $R_{12}$ possibly being an alkyl, arylalkyl, acyl, carboalkoxy, alkyl ether, silyl, alkylsilyl radical, comprising from 1 to 20 carbon atoms,
M represents an alkali or alkaline-earth metal,
n and n', which may be identical or different, each represent an integer greater than or equal to 1 and less than or equal to 8,
p is an integer between from 0 to 50, and
A is a nitrogen atom, a single bond, or a saturated or unsaturated carbon-based chain of 1 to 20 carbon atoms.

Preferably, in formula (I):
$R_3$, $R_6$ and $R_9$ are —OH radicals,
$R_4$, $R_7$ and $R_{10}$ are hydrogen atoms,
$R_5$, $R_8$ and $R_{11}$ are saturated or unsaturated carbon-based chains containing from 1 to 20 carbon atoms, preferably from 3 to 5 carbon atoms,
n and n' are 2,
p is from 1 to 10, preferably from 3 to 8.

Preferentially, the organic polysulfide is an aromatic polysulfide corresponding to the following general formula (II):

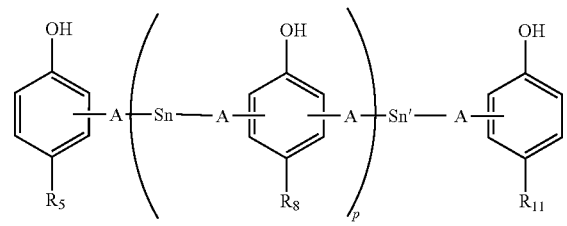

in which:
$R_5$, $R_8$ and $R_{11}$, which may be identical or different, preferably identical, represent a saturated or unsaturated carbon-based chain containing from 1 to 20 carbon atoms,
n and n', which may be identical or different, each represent an integer greater than or equal to 1 and less than or equal to 8,
p is an integer between from 0 to 50, and
A is a nitrogen atom, a single bond, or a saturated or unsaturated carbon-based chain of 1 to 20 carbon atoms.

Preferably, in formula (II):
$R_5$, $R_8$ and $R_{11}$ are saturated carbon-based chains containing from 1 to 20 carbon atoms, preferably from 3 to 5 carbon atoms,
n and n' are 2,
p is from 1 to 10, preferably from 3 to 8.

Preferably, in the compounds of formula (I) and (II), $R_5$, $R_8$ and $R_{11}$, which may be identical or different, preferably identical, represent a tert-butyl or tert-amyl, preferably a tert-butyl, group.

Preferably, the organic polysulfide is para-tert-butylphenol disulfide.

Organic polysulfides are well known to those skilled in the art and are described in particular in document WO 2013/155038. As examples of commercially available organic polysulfides, mention may in particular be made of Vultac TB7 from the company Arkema or else GUS-M5 from the company M and B Greenus Co., Ltd.

Advantageously, the content of the at least one organic polysulfide, in the composition of the tyre according to the invention, is within a range extending from 0.1 to 1 phr, preferably from 0.1 to 9 phr, preferably from 0.15 to 0.5 phr.

Preferably, the total content of organic polysulfide, in the composition of the tyre according to the invention, is within a range extending from 0.1 to 1 phr. Below 0.1 phr, the amount of organic polysulfide is no longer sufficient to initiate a partial vulcanization of the rubber composition at low temperature (before curing). Above 1 phr, the rubber composition crosslinks too rapidly before the curing of the tyre, which negatively impacts the processability. Preferably, the total content of organic polysulfide, in the composition of the tyre according to the invention, is within a range extending from 0.1 to 9 phr, preferably from 0.15 to 0.5 phr.

II-3 Crosslinking System

According to the invention, the composition of the tyre comprises a vulcanization system. This vulcanization system is based on sulfur (molecular sulfur and/or sulfur-donating agent). Advantageously, the vulcanization system comprises molecular sulfur. Furthermore, it advantageously does not comprise any sulfur donor other than the at least one organic polysulfide.

The content of sulfur, preferably molecular sulfur, in the composition of the tyre according to the invention is preferentially within a range extending from 0.2 to 10 phr, preferably from 0.2 to 5 phr, more preferably from 0.5 to 2 phr.

The vulcanization system advantageously further comprises a vulcanization accelerator. Preferably, the vulcanization accelerator is chosen from tetrabenzylthiuram disulfide (abbreviated to "TBZTD") and the family of the sulfenamides consisting of 2-mercaptobenzothiazole disulfide (abbreviated to "MBTS"), N-cyclohexyl-2-benzothiazolesulfenamide (abbreviated to "CBS"), N,N-dicyclohexyl-2-benzothiazolesulfenamide (abbreviated to "DCB S"), N-(tert-butyl)-2-benzothiazolesulfenamide (abbreviated to "TBBS"), N-(tert-butyl)-2-benzothiazolesulfenimide (abbreviated to "TBSI") and the mixtures of these compounds. Particularly advantageously, the vulcanization accelerator is CBS.

The vulcanization system may also comprise other vulcanization accelerators and activators such as zinc oxide, stearic acid, a guanidine derivative (for example diphenylguanidine). The vulcanization system also comprises a vulcanization retarder, such as N-(cyclohexylthio)phthalimide (abbreviated to "CTP").

The combined vulcanization accelerators, retarders and activators are used at a preferred content of between 0.5 and 15 phr. The vulcanization accelerator is used at a preferential content of between 0.5 and 10 phr, more preferentially of between 0.5 and 5 phr.

II-4 Reinforcing Filler

The composition of the tyre according to the invention may additionally comprise a reinforcing filler, known for its abilities to reinforce a rubber composition.

The reinforcing filler may comprise carbon black, reinforcing inorganic filler or a mixture thereof. Advantageously, the reinforcing filler predominantly, preferably exclusively, comprises carbon black.

The content of reinforcing filler, preferably of carbon black, in the composition is preferably within a range extending from 1 to 200 phr, preferably from 5 to 80 phr, more preferably from 30 to 70 phr.

The blacks which can be used in the context of the present invention can be any black conventionally used in the field of tyres or their treads ("tyre-grade" blacks). Among the latter, mention will more particularly be made of the reinforcing carbon blacks of the 100, 200 and 300 series, or the blacks of the 500, 600 or 700 series (ASTM grades), such as, for example, the N115, N134, N234, N326, N330, N339, N347, N375, N550, N683 or N772 blacks. These carbon blacks can be used in the isolated state, as available commercially, or in any other form, for example as support for some of the rubber additives used. The carbon blacks might, for example, be already incorporated in the diene elastomer, in particular isoprene elastomer, in the form of a masterbatch (see, for example, applications WO 97/36724 or WO 99/16600).

The term "reinforcing inorganic filler" should be understood here as meaning any inorganic or mineral filler, whatever its colour and its origin (natural or synthetic), also referred to as "white" filler, "clear" filler or even "non-black" filler, in contrast to carbon black, capable of reinforcing, by itself alone, without means other than an intermediate coupling agent, a rubber composition. In a known way, some reinforcing inorganic fillers can be characterized in particular by the presence of hydroxyl (—OH) groups at their surface.

Mineral fillers of the siliceous type, preferentially silica ($SiO_2$), or of the aluminous type, especially alumina ($Al_2O_3$), are suitable in particular as reinforcing inorganic fillers. The silica used can be any reinforcing silica known to those skilled in the art, in particular any precipitated or fumed silica having a BET surface area and also a CTAB specific surface area both of less than 450 $m^2/g$, preferably within a range extending from 30 to 400 $m^2/g$, in particular from 60 to 300 $m^2/g$. Preferably, the silica has a BET specific surface area of less than 200 $m^2/g$ and/or a CTAB specific surface area of less than 220 $m^2/g$, preferably a BET specific surface area within a range extending from 125 to 200 $m^2/g$ and/or a CTAB specific surface area within a range extending from 140 to 170 $m^2/g$.

The BET specific surface area of the silica is determined by gas adsorption using the Brunauer-Emmett-Teller method described in "The Journal of the American Chemical Society" (Vol. 60, page 309, February 1938), and more specifically according to a method adapted from standard NF ISO 5794-1, Appendix E, of June 2010 [multipoint (5 point) volumetric method—gas:nitrogen—degassing under vacuum: one hour at 160° C.—relative pressure $p/p_0$ range: 0.05 to 0.17].

For the inorganic fillers, such as silica, for example, the CTAB specific surface area values were determined according to standard NF ISO 5794-1, Appendix G, of June 2010. The process is based on the adsorption of CTAB (N-hexadecyl-N,N,N-trimethylammonium bromide) on the "external" surface of the reinforcing filler.

Mention will be made, as silicas which can be used in the context of the present invention, for example, of highly dispersible precipitated silicas (referred to as "HDS" for "highly dispersible" or "highly dispersible silica"). These precipitated silicas, which may or may not be highly dispersible, are well known to those skilled in the art. Mention may be made, for example, of the silicas described in applications WO03/016215-A1 and WO03/016387-A1. Use may in particular be made, among commercial HDS silicas, of the Ultrasil® 5000GR and Ultrasil® 7000GR silicas from Evonik or the Zeosil® 1085GR, Zeosil® 1115 MP, Zeosil® 1165MP, Zeosil® Premium 200MP and Zeosil® HRS 1200 MP silicas from Solvay. Use may be made, as non-HDS silica, of the following commercial silicas: the Ultrasil® VN2GR and Ultrasil® VN3GR silicas from Evonik, the Zeosil® 175GR silica from Solvay or the Hi-Sil EZ120G(-D), Hi-Sil EZ160G(-D), Hi-Sil EZ200G(-D), Hi-Sil 243LD, Hi-Sil 210 and Hi-Sil HDP 320G silicas from PPG.

The physical state in which the reinforcing inorganic filler is provided is not important, whether it is in the form of a powder, of micropearls, of granules, or else of beads or any other appropriate densified form. Of course, reinforcing inorganic filler is also understood to mean mixtures of different reinforcing inorganic fillers, in particular of silicas as described above.

A person skilled in the art will understand that, as replacement for the reinforcing inorganic filler described above, use might be made of a reinforcing filler of another nature, provided that this reinforcing filler of another nature is covered with an inorganic layer, such as silica, or else comprises functional sites, in particular hydroxyl sites, at its surface which require the use of a coupling agent in order to establish the bond between this reinforcing filler and the diene elastomer. Mention may be made, by way of example, of carbon blacks partially or completely covered with silica, or of carbon blacks modified by silica, such as, without limitation, the fillers of Ecoblack® type of the CRX2000 series or of the CRX4000 series from Cabot Corporation.

When an inorganic filler (for example silica) is used in the composition, alone or as a blend with carbon black, its content is within a range from 0 to 70 phr (preferentially from 0 to 50 phr), in particular also from 5 to 70 phr, and more preferentially still this proportion varies from 5 to 60 phr, particularly from 30 to 60 phr.

Use may be made, in order to couple the reinforcing inorganic filler to the diene elastomer, in a well-known way, of an at least bifunctional coupling agent (or bonding agent) intended to provide a satisfactory connection, of chemical and/or physical nature, between the inorganic filler (surface of its particles) and the diene elastomer. Use is made in particular of organosilanes or polyorganosiloxanes which are at least bifunctional. The term "bifunctional" is understood to mean a compound having a first functional group capable of interacting with the inorganic filler and a second functional group capable of interacting with the diene elastomer. For example, such a bifunctional compound can comprise a first functional group comprising a silicon atom, said first functional group being capable of interacting with the hydroxyl groups of an inorganic filler, and a second functional group comprising a sulfur atom, said second functional group being capable of interacting with the diene elastomer.

Preferentially, the organosilanes are selected from the group consisting of organosilane polysulfides (symmetrical or asymmetrical), such as bis(3-triethoxysilylpropyl) tetrasulfide, abbreviated to TESPT, sold under the name Si69 by Evonik, or bis(3-triethoxysilylpropyl) disulfide, abbreviated to TESPD, sold under the name Si75 by Evonik, polyorganosiloxanes, mercaptosilanes, blocked mercaptosilanes, such as S-(3-(triethoxysilyl)propyl) octanethioate, sold by Momentive under the name NXT Silane. More preferentially, the organosilane is an organosilane polysulfide.

Of course, use might also be made of mixtures of the coupling agents described above.

The content of coupling agent in the composition of the invention advantageously represents from 0.5% to 15% by weight, with respect to the amount of reinforcing inorganic filler. When a reinforcing inorganic filler is present, its content is preferentially within a range of from 0.5 to 10 phr, more preferentially within a range of from 1 to 5 phr. This content is easily adjusted by a person skilled in the art according to the content of reinforcing inorganic filler used in the composition of the invention.

II-5 Possible Additives

The rubber compositions of the tyre according to the invention may optionally also comprise all or some of the usual additives customarily used in elastomer compositions for tyres, such as for example plasticizers (such as plasticizing oils and/or plasticizing resins), pigments, protective agents such as anti-ozone waxes, chemical anti-ozonants, antioxidants, anti-fatigue agents, reinforcing resins (as described for example in application WO 02/10269).

The composition may in particular comprise a plasticizing hydrocarbon resin. The plasticizing hydrocarbon resin is selected from the group consisting of cyclopentadiene or dicyclopentadiene homopolymer or copolymer resins, terpene homopolymer or copolymer resins, terpene/phenol homopolymer or copolymer resins, $C_5$ cut homopolymer or copolymer resins, $C_9$ cut homopolymer or copolymer resins, α-methylstyrene homopolymer or copolymer resins and mixtures thereof. Advantageously, the plasticizing resin is an aromatic dicyclopentadiene resin, preferably comprising predominantly styrene, ethylene and dicyclopentadiene units.

Advantageously, the content of plasticizing hydrocarbon resin in the composition of the tyre according to the invention is within a range extending from 2 to 40 phr, preferably from 2 to 20 phr. Such resins are described for example in section I-4-1 of application WO 2016/202968.

Furthermore, the composition of the tyre according to the invention advantageously does not comprise any plasticizing oil or comprises less than 5 phr thereof. Mention may be made, as plasticizing oil, of the liquid plasticizers mentioned in section I-4-2 of application WO 2016/202968.

II-6 Preparation of the Rubber Compositions

The composition of the tyre according to the invention may be manufactured in appropriate mixers using two successive preparation phases well known to those skilled in the art: a first phase of thermomechanical working or kneading ("non-productive" phase), which can be carried out in a single thermomechanical stage during which all the necessary constituents, in particular the elastomeric matrix, the reinforcing filler and the optional other various additives, with the exception of the crosslinking system, are introduced into an appropriate mixer, such as a standard internal mixer (for example of 'Banbury' type). The incorporation of the optional filler into the elastomer can be carried out in one or more goes by thermomechanically kneading. In the case where the filler is already incorporated, in full or in part, in the elastomer in the form of a masterbatch, as is described, for example, in applications WO 97/36724 and WO 99/16600, it is the masterbatch which is directly kneaded and, if appropriate, the other elastomers or fillers present in the composition which are not in the masterbatch form, and also the optional other various additives other than the crosslinking system, are incorporated. The non-productive phase can be carried out at high temperature, up to a maximum temperature of between 110° C. and 200° C., preferably between 130° C. and 185° C., for a period of time generally of between 2 and 10 minutes; a second phase of mechanical working ("productive" phase), which is carried out in an external mixer, such as an open mill, after cooling the mixture obtained during the first non-productive phase down to a lower temperature, typically of less than 120° C., for example between 40° C. and 100° C. The crosslinking system is then incorporated and the combined mixture is then mixed for a few minutes, for example between 5 and 15 minutes.

Such phases have been described, for example, in applications EP-A-0501227, EP-A-0735088, EP-A-0810258, WO 00/05300 or WO 00/05301.

The final composition thus obtained is then calendered, for example in the form of a sheet or of a slab, in particular for characterization in the laboratory, or else extruded (or co-extruded with another rubber composition) in the form of a rubber semi-finished product (or profiled element) which can be used, for example, as a tyre tread. These products can subsequently be used for the manufacture of tyres, according to techniques known to those skilled in the art.

The composition may be either in the green state (before crosslinking or vulcanization) or in the cured state (after crosslinking or vulcanization), and may be a semi-finished product which can be used in a tyre.

The crosslinking of the composition can be carried out in a way known to those skilled in the art, for example at a temperature of between 130° C. and 200° C., under pressure.

II-7 Tyre

According to the invention, the tyre is provided with a tread having a mean volumetric void ratio over the entire tread of greater than 10%.

The volumetric void ratio of the tread may be obtained in particular by comparing the volume occupied by the lugs or tread blocks of a tread (hereinafter referred to as "lug vol") with the volume of a tread which differs from the previous tread only in that it does not comprise any grooves (the volume occupied by the grooves is filled with rubbers). The volumetric void ratio (vol ratio) can thus be obtained by applying the following formula: vol ratio=1–(lug vol/smooth vol).

Preferably, the tread of the tyre has a mean volumetric void ratio over the entire tread of greater than 15%, preferably between 15% and 80%, preferably between 30% and 75%. Advantageously, the tread of the tyre has a mean tread block height of greater than 20 mm, preferably between 25 and 130 mm, preferably between 65 and 120 mm.

The mean tread block height can be measured simply with a ruler or a depth gauge. In particular, the distance as measured between the surface of the tread intended to come into contact with the ground when running and the surface of the bottom of the deepest adjacent groove.

The composition of the tyre according to the invention can be present in any item of the tyre. Preferably, the composition of the tyre according to the invention is present in at least one item of the tyre selected from the group consisting of the tread, the undertread and the crown plies. Preferably, it is present in the tread of the tyre.

Advantageously, the tyre according to the invention is a tyre for a construction plant vehicle or for an agricultural vehicle.

III-Preferred Embodiments

In the light of the above, the preferred embodiments of the invention are described below:

A. Tyre provided with a tread, of which the mean volumetric void ratio over the entire tread is greater than 10%, said tyre comprising a composition based on at least one diene elastomer, on a vulcanization system and from 0.10 to 1.00 phr of at least one organic polysulfide.

B. Tyre according to embodiment A, wherein the organic polysulfide is not silicon-containing.

C. Tyre according to either one of the preceding embodiments, wherein the organic polysulfide is an aromatic polysulfide corresponding to the following general formula (I):

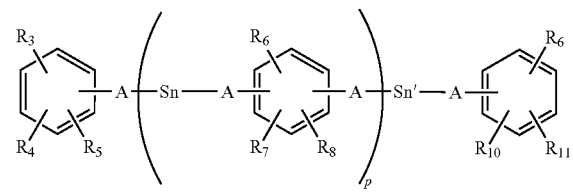

in which:
$R_3$ to $R_{11}$, which may be identical or different, represent a hydrogen atom, an —OH or —O⁻M⁺ radical, or a saturated or unsaturated carbon-based chain containing from 1 to 20 carbon atoms, or a group —OR$_{12}$, with $R_{12}$ possibly being an alkyl, arylalkyl, acyl, carboalkoxy, alkyl ether, silyl, alkylsilyl radical, comprising from 1 to 20 carbon atoms,
M represents an alkali or alkaline-earth metal,
n and n', which may be identical or different, each represent an integer greater than or equal to 1 and less than or equal to 8,
p is an integer between from 0 to 50, and
A is a nitrogen atom, a single bond, or a saturated or unsaturated carbon-based chain of 1 to 20 carbon atoms.

D. Tyre according to embodiment C, wherein, in the formula (I):
$R_3$, $R_6$ and $R_9$ are —OH radicals,
$R_4$, $R_7$ and $R_{10}$ are hydrogen atoms,
$R_5$, $R_8$ and $R_{11}$ are saturated or unsaturated carbon-based chains containing from 1 to 20 carbon atoms, preferably from 3 to 5 carbon atoms,
the mean value of n and n' is 2,
the mean value of p is between from 1 to 10, preferably from 3 to 8. (These mean values are calculated in a manner well known to those skilled in the art from proton NMR data and by assaying the sulfur by weight.)

E. Tyre according to any one of embodiments A to C, wherein the organic polysulfide is an aromatic polysulfide corresponding to the following general formula (II):

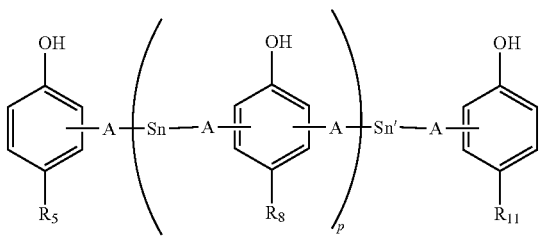

in which:
R$_5$, R$_8$ and R$_{11}$, which may be identical or different, preferably identical, represent a saturated or unsaturated carbon-based chain containing from 1 to 20 carbon atoms, n and n', which may be identical or different, each represent an integer greater than or equal to 1 and less than or equal to 8, p is an integer between from 0 to 50, and A is a nitrogen atom, a single bond, or a saturated or unsaturated carbon-based chain of 1 to 20 carbon atoms.

F. Tyre according to embodiment E, wherein, in the formula (II):
R$_5$, R$_8$ and Ru are saturated carbon-based chains containing from 1 to 20 carbon atoms, preferably from 3 to 5 carbon atoms,
the mean value of n and n' is 2,
the mean value of p is between from 1 to 10, preferably from 3 to 8. (These mean values are calculated in a manner well known to those skilled in the art from proton NMR data and by assaying the sulfur by weight.)

G. Tyre according to any one of embodiments C to F, wherein, in the compounds of formula (I) and (II), R$_5$, R$_8$ and R$_{11}$, which may be identical or different, preferably identical, represent a tert-butyl or tert-amyl, preferably a tert-butyl, group.

H. Tyre according to any one of the preceding embodiments, wherein the organic polysulfide is para-tert-butylphenol disulfide.

I. Tyre according to any one of the preceding embodiments, wherein the content of the at least one organic polysulfide, in the composition, is within a range extending from 0.10 to 0.90 phr, preferably from 0.10 to 0.70 phr, more preferably from 0.15 to 0.50 phr.

J. Tyre according to any one of the preceding embodiments, wherein the total content of organic polysulfide, in the composition, is within a range extending from 0.10 to 1.00 phr, preferably from 0.1 to 0.90 phr, more preferably from 0.15 to 0.50 phr.

K. Tyre according to any one of the preceding embodiments, wherein the diene elastomer is selected from the group consisting of polybutadienes, synthetic polyisoprenes, natural rubber, butadiene copolymers, isoprene copolymers and the mixtures of these elastomers.

L. Tyre according to any one of the preceding embodiments, wherein the vulcanization system comprises molecular sulfur and/or at least one sulfur-donating agent other than the at least one organic polysulfide.

M. Tyre according to any one of the preceding embodiments, wherein the content of molecular sulfur in the composition is within a range extending from 0.2 to 5 phr, preferably from 0.5 to 2 phr.

N. Tyre according to any one of the preceding claims, wherein the vulcanization system does not comprise any sulfur donor other than the at least one organic polysulfide.

O. Tyre according to any one of the preceding embodiments, wherein the composition further comprises a reinforcing filler.

P. Tyre according to embodiment O, wherein the reinforcing filler comprises carbon black, reinforcing inorganic filler or a mixture thereof.

Q. Tyre according to embodiment O or P, wherein the content of reinforcing filler in the composition is within a range extending from 1 to 200 phr, preferably from 5 to 80 phr, and preferably from 30 to 70 phr.

R. Tyre according to any one of the preceding embodiments, wherein the composition further comprises a plasticizing hydrocarbon resin.

S. Tyre according to embodiment R, wherein the plasticizing hydrocarbon resin is selected from the group consisting of cyclopentadiene or dicyclopentadiene homopolymer or copolymer resins, terpene homopolymer or copolymer resins, terpene/phenol homopolymer or copolymer resins, C$_5$ cut homopolymer or copolymer resins, C$_9$ cut homopolymer or copolymer resins, α-methylstyrene homopolymer or copolymer resins and mixtures thereof.

T. Tyre according to embodiment R or S, wherein the plasticizing hydrocarbon resin is an aromatic dicyclopentadiene resin, preferably comprising predominantly styrene, ethylene and dicyclopentadiene units.

U. Tyre according to any one of embodiments R to T, wherein the content of plasticizing hydrocarbon resin in the composition is within a range extending from 2 to 40 phr, preferably from 2 to 20 phr.

V. Tyre according to any one of the preceding embodiments, wherein the composition does not comprise any plasticizing oil or comprises less than 5 phr thereof W. Tyre according to any one of the preceding embodiments, the tread of which has a mean tread block height of greater than 20 mm, preferably between 25 and 130 mm, preferably between 65 and 120 mm.

X. Tyre according to any one of the preceding embodiments, the tread of which has a mean volumetric void ratio over the entire tread of between 15% and 80%, preferably between 30% and 75%.

Y. Tyre according to any one of the preceding embodiments, wherein the composition is present in at least one item of the tyre selected from the group consisting of the tread, the undertread and the crown plies.

Z. Tyre according to any one of the preceding embodiments, said tyre being a tyre for a construction plant vehicle or for an agricultural vehicle.

IV-EXAMPLES

IV-1 Measurements and Tests Used

Mooney Plasticity (Before Curing)

Use is made of an oscillating consistometer as described in French standard NF T 43-005 (1991). The Mooney plasticity measurement is carried out according to the following principle: the composition in the green state (i.e., before curing) is moulded in a cylindrical chamber heated to 100° C. After preheating for one minute, the rotor rotates within the test specimen at 2 revolutions/minute and the working torque for maintaining this movement is measured after rotating for 4 minutes. The Mooney plasticity (ML 1+4) is expressed in "Mooney units" (MU, where 1 MU=0.83 newton.metre).

It should be remembered that, in a way well known to those skilled in the art, the lower the Mooney plasticity, the easier the material is to work. Of course, beyond a certain value (e.g., 20 MU), the material becomes too liquid to be industrially usable.

Rheometry (During Curing)

The measurements are performed at 150° C. with an oscillating-chamber rheometer, according to the standard DIN 53529-Part 3 (June 1983). The change in the rheometric torque, ΔTorque, as a function of the time describes the change in the stiffening of the composition as a result of the vulcanization reaction. The measurements are processed according to standard DIN 53529-Part 2 (March 1983): T0 is the induction period (expressed in min), that is to say the time necessary for the start of the vulcanization reaction; Tα (for example T90) is the time necessary to achieve a conversion of α%, that is to say α% (for example 90%) of the difference between the minimum and maximum torques. The lower the value of ta, the more rapidly the composition will have crosslinked, that is to say that the curing will have been rapid.

Dynamic Properties (after Curing)

These tensile tests make it possible to determine the elasticity stresses and the properties at break. Unless otherwise indicated, they are carried out in accordance with French standard NF T 46-002 of September 1988. Processing the tensile recordings also makes it possible to plot the curve of modulus as a function of the elongation. The modulus used here is the nominal (or apparent) secant modulus measured in first elongation, calculated by normalizing to the initial cross section of the test specimen. The nominal secant moduli (or apparent stresses, in MPa) are measured in first elongation at 10% and 100% elongation, respectively denoted M10 and M100.

The M10 and M100 stiffness results are presented in "base 100" relative to the Control A composition. The higher the value, the stiffer the composition at low and high strain respectively.

All these tensile measurements are carried out under the standard conditions of temperature (23±2° C.) and hygrometry (50±5% relative humidity), according to French standard NF T 40-101 (December 1979).

The dynamic properties G*(10%) and tan(δ)max at 60° C. are measured on a viscosity analyser (Metravib VA4000), according to Standard ASTM D 5992-96. The response of a sample of crosslinked composition (cylindrical test specimen with a thickness of 4 mm and a cross section of 400 mm$^2$), subjected to a simple alternating sinusoidal shear stress, at a frequency of 10 Hz, under the defined conditions of temperature, for example at 60° C., according to standard ASTM D 1349-99 or, as the case may be, at a different temperature, is recorded. A strain amplitude sweep is carried out from 0.1% to 50% (outward cycle) and then from 50% to 0.1% (return cycle). The results made use of are the complex dynamic shear modulus G* and the loss factor tan(δ). The maximum value of tan(δ) observed, denoted tan(δ)max, and the complex dynamic shear modulus G*(10%) at 10% strain, at 60° C., are shown for the return cycle.

It is recalled that, in a manner well known to those skilled in the art, the value of tan(δ)max at 60° C. is representative of the hysteresis of the material and therefore of the rolling resistance: the lower the tan(δ)max at 60° C., the more reduced and therefore improved is the rolling resistance.

IV-2 Preparation of the Compositions

In the examples which follow, the rubber compositions were produced as described in point II-6 above. In particular, the "non-productive" phase was carried out in a 0.4 litre mixer for 3.5 minutes, for a mean blade speed of 50 revolutions per minute, until a maximum dropping temperature of 160° C. was reached. The "productive" phase was carried out in an open mill at 23° C. for 5 minutes. The composition was calendered, for example, in the form of a slab for characterization in the laboratory before and after curing.

The crosslinking of the composition was carried out at a temperature of between 130° C. and 200° C., under pressure.

IV-3 Tests on Rubber Compositions

The object of the examples presented below is to compare the curing rate of two compositions in accordance with the invention (C1 and C2) with two control compositions (T1 and T2).

The formulations tested all contain: 70 phr of a tin-coupled solution SBR with styrene %: 26.5, vinyl %: 35, trans %: 48 (Tg: −65° C.); 30 phr of a 3-tris(di-tert-butylphenyl)phosphite star-branched solution SBR with 41% of styrene units and 24% of 1,2-units of the butadiene part (Tg: −25° C.); 47 phr of ASTM Grade N234 carbon black from Cabot; 10 phr of "Novares TC160" DCPD/aromatic resin from Rutgers, Mn=710 g/mol; Mw=2000 g/mol; Ip=2.8, Tg=106° C. Aromatic protons: 13%, Ethylenic protons: 5.6%, Aliphatic protons: 81.4%; 1.5 phr of tackifying resin ("Escorez 1102" from EXXON (Mn=1370 g/mol; Ip=2.3)); 3 phr of N-1,3-dimethylbutyl-N-phenyl-para-phenylenediamine (Santoflex 6-PPD from Flexsys); 2 phr of "VARAZON 4959" anti-ozone wax from Sasol Wax; 1.2 phr of sulfur; 1.8 phr of "Santocure CBS" N-cyclohexyl-2-benzothiazolesulfenamide from Flexsys; 1 phr of "Pristerene 4931" stearic acid from Uniqema; 1.5 phr of zinc oxide (industrial grade-Umicore); and 0.1 phr of N-cyclohexylthiophthalimide sold under the name ("CTP") "Vulkalent G" from Lanxess.

The compositions T1, T2, C1 and C2 differ by the content of poly-tert-butylphenol disulfide (APDS) ("Vultac TB7" from Arkema), which is respectively 0; 0.05; 0.15 and 0.30 phr. The results obtained are presented in Table 1 below.

TABLE 1

| Results | T1 | T2 | C1 | C2 |
|---------|------|------|------|------|
| T90 | 15.30 | 15.24 | 14.04 | 13.73 |
| MA10 | 100 | 99 | 111 | 110 |
| MA100 | 100 | 100 | 111 | 108 |

These results show that the composition of the tyre in accordance with the invention crosslinks more rapidly than the control compositions not comprising any organic polysulfide. This is particularly advantageous for large tyres in order to limit the modifications of the architecture of the various plies of a tyre before and after curing.

Moreover, these results also show that the compositions in accordance with the invention have greater stiffnesses at low and high strain. In addition, it was found that the Mooney value of the compositions in accordance with the invention in the green state and the to hysteresis of the compositions in accordance with the invention after curing were not affected or only slightly affected.

The invention claimed is:

1. A tire provided with a tread, of which a mean volumetric void ratio over the entire tread is greater than 10%, the tire comprising a composition based on at least one diene elastomer, on a vulcanization system, and from 0.10 to 1 phr of at least one organic polysulfide, wherein the at least one organic polysulfide is an aromatic polysulfide corresponding to general formula (I):

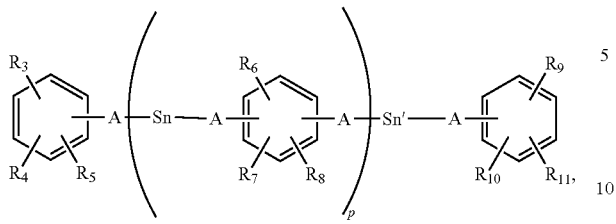

(I)

in which:

$R_3$ to $R_{11}$, which may be identical or different, represent a hydrogen atom, an —OH or —O⁻M⁺ radical, or a saturated or unsaturated carbon-based chain containing from 1 to 20 carbon atoms, or a group —OR$_{12}$, with $R_{12}$ being an alkyl, arylalkyl, acyl, carboalkoxy, alkyl ether, silyl, or alkylsilyl radical, comprising from 1 to 20 carbon atoms, M represents an alkali or alkaline-earth metal, n and n', which may be identical or different, each represent an integer greater than or equal to 1 and less than or equal to 8, p is an integer from 0 to 50, and A is a nitrogen atom, a single bond, or a saturated or unsaturated carbon-based chain of 1 to 20 carbon atoms.

2. The tire according to claim 1, wherein, in the formula (I):

$R_3$, $R_6$ and $R_9$ are —OH radicals, $R_4$, $R_7$ and $R_{10}$ are hydrogen atoms, $R_5$, $R_8$ and $R_{11}$ are saturated or unsaturated carbon-based chains containing from 1 to 20 carbon atoms, n and n' are 2, and p is from 1 to 10.

3. The tire according to claim 1, wherein the content of the at least one organic polysulfide, in the composition is within a range extending from 0.10 to 0.90 phr.

4. The tire according to claim 1, wherein the at least one diene elastomer is selected from the group consisting of polybutadienes, synthetic polyisoprenes, natural rubber, butadiene copolymers, isoprene copolymers and mixtures thereof.

5. The tire according to claim 1, wherein the vulcanization system comprises molecular sulfur and/or at least one sulfur-donating agent other than the at least one organic polysulfide.

6. The tire according to claim 1, wherein the composition further comprises a reinforcing filler comprising carbon black, reinforcing inorganic filler or a mixture thereof.

7. The tire according to claim 1, wherein the tread has a mean tread block height of greater than 20 mm.

8. The tire according to claim 1, wherein the tread has a mean volumetric void ratio over the entire tread of between 15% and 80%.

9. The tire according to claim 1, wherein the composition is present in the tread of the tire.

10. The tire according to claim 1, wherein the tire is a tire for a construction plant vehicle or for an agricultural vehicle.

11. A tire provided with a tread, of which a mean volumetric void ratio over the entire tread is greater than 10%, the tire comprising a composition based on at least one diene elastomer, on a vulcanization system, and from 0.10 to 1 phr of at least one organic polysulfide, wherein the at least one organic polysulfide is an aromatic polysulfide corresponding to general formula (II):

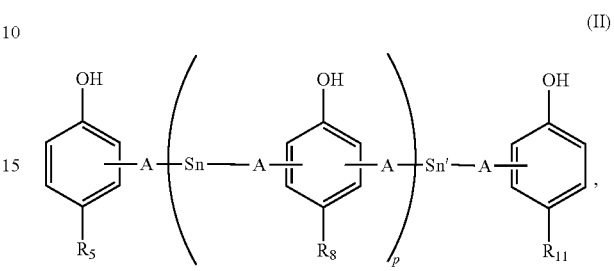

(II)

in which:

$R_5$, $R_8$ and $R_{11}$, which may be identical or different, represent a saturated or unsaturated carbon-based chain containing from 1 to 20 carbon atoms, n and n', which may be identical or different, each represent an integer greater than or equal to 1 and less than or equal to 8, p is an integer from 0 to 50, and A is a nitrogen atom, a single bond, or a saturated or unsaturated carbon-based chain of 1 to 20 carbon atoms.

12. The tire according to claim 11, wherein $R_5$, $R_8$ and $R_{11}$, which may be identical or different, represent a tert-butyl or tert-amyl group.

13. The tire according to claim 11, wherein the content of the at least one organic polysulfide, in the composition is within a range extending from 0.10 to 0.90 phr.

14. The tire according to claim 11, wherein the at least one diene elastomer is selected from the group consisting of polybutadienes, synthetic polyisoprenes, natural rubber, butadiene copolymers, isoprene copolymers and mixtures thereof.

15. The tire according to claim 11, wherein the vulcanization system comprises molecular sulfur and/or at least one sulfur-donating agent other than the at least one organic polysulfide.

16. The tire according to claim 11, wherein the composition further comprises a reinforcing filler comprising carbon black, reinforcing inorganic filler or a mixture thereof.

17. The tire according to claim 11, wherein the tread has a mean tread block height of greater than 20 mm.

18. The tire according to claim 11, wherein the tread has a mean volumetric void ratio over the entire tread of between 15% and 80%.

19. The tire according to claim 11, wherein the composition is present in the tread of the tire.

20. The tire according to claim 11, wherein the tire is a tire for a construction plant vehicle or for an agricultural vehicle.

* * * * *